United States Patent [19]

Fleischer

[11] Patent Number: 4,697,278
[45] Date of Patent: Sep. 29, 1987

[54] ELECTRONIC HUB ODOMETER

[75] Inventor: Donald W. Fleischer, Wethersfield, Conn.

[73] Assignee: Veeder Industries Inc., Hartford, Conn.

[21] Appl. No.: 707,073

[22] Filed: Mar. 1, 1985

[51] Int. Cl.$^4$ ............................................. G01C 22/00
[52] U.S. Cl. ................................. 377/24; 346/33 D; 364/424; 364/561; 235/95 B; 235/95 C; 235/97
[58] Field of Search ............ 377/24; 235/95 R, 95 A, 235/95 B, 95 C, 96, 97; 324/166; 346/33 D; 364/483, 492, 424, 561

[56] References Cited

U.S. PATENT DOCUMENTS

| | | | |
|---|---|---|---|
| 3,735,103 | 5/1973 | Finley | 235/95 B |
| 4,031,466 | 6/1977 | Krause et al. | 324/166 |
| 4,053,749 | 10/1977 | Shinoda et al. | 235/95 R |
| 4,139,889 | 2/1979 | Ingels | 364/424 |
| 4,156,131 | 5/1979 | Haynes et al. | 235/95 C |
| 4,188,618 | 2/1980 | Weisbart | 340/870.16 |
| 4,270,174 | 5/1981 | Karlin | 364/424 |
| 4,275,292 | 6/1981 | Corbi | 377/24 |
| 4,323,976 | 4/1982 | Radaelli et al. | 377/39 |
| 4,328,413 | 5/1982 | O'Neil et al. | 377/24 |
| 4,338,512 | 7/1982 | Ludwig | 377/20 |
| 4,371,945 | 2/1983 | Karr et al. | 235/105 |
| 4,430,800 | 2/1984 | Shimano | 235/95 R |
| 4,434,801 | 3/1984 | Jiminez et al. | 324/166 |
| 4,517,468 | 5/1985 | Kemper et al. | 364/492 |
| 4,532,710 | 8/1985 | Kinney et al. | 235/95 R |
| 4,547,781 | 10/1985 | Gelhorn et al. | 377/24 |
| 4,589,075 | 5/1986 | Bvennagel | 364/492 |
| 4,620,280 | 10/1986 | Conklin | 364/424 |

FOREIGN PATENT DOCUMENTS

| | | |
|---|---|---|
| 0129949 | 1/1985 | European Pat. Off. . |
| 204323 | 11/1984 | Japan ............ 364/424 |

Primary Examiner—John S. Heyman
Attorney, Agent, or Firm—Chilton, Alix & Van Kirk

[57] ABSTRACT

An electronic hub odometer employs a permanent magnet and a magnetic reed switch for recording the number of revolutions of a vehicle wheel to which the odometer is mounted. A programmable integrated circuit electrically communicates with a clock crystal and the magnetic reed switch to automatically produce data relative to the time, distance and rate of travel of the associated vehicle. The data is stored in a random access memory integrated circuit. An infrared light emitting diode is employed for transmitting the data from the odometer to a remote unit. Information is also transmitted to the odometer from a remote unit via a photo-optical detector.

20 Claims, 4 Drawing Figures

ELECTRONIC HUB ODOMETER

BACKGROUND OF THE INVENTION

This invention relates generally to hub mounted odometers which are employed for recording the revolutions of a vehicle wheel. More particularly, this invention relates to an odometer incorporating electronic means for recording information associated with the operation of a vehicle.

Mechanical odometers which are mounted to the hub of a vehicle and employ a mechanical counter for recording the distance traveled by the vehicle wheel are well-known. Such odometers may have a pendulous core which is suspended within an external housing mounted for rotation with the associated vehicle wheel. Exemplary hub odometers such as disclosed in U.S. Pat. No. 3,198,430 of Robert Hermann and U.S. Pat. No. 4,156,131 of Jerry L. Haynes and Oliver R. Thomas, Jr. employ a pawl which is engageable with teeth on a ratchet wheel for indexing the mechanical counter. The counter is mounted on a pendulous core. A damping mechanism prevents the rotation of the pendulous core.

The present invention is an electronic odometer which employs integrated circuits and electronic components to automatically compile, process and record large quantities of vehicle operation data as well as types of operation data not commonly provided by the mechanical hub odometer. The electronic hub odometer mounts to the hub of a vehicle or trailer wheel and is relatively easy to install. The information generated by the odometer is ordinarily in machine readable form for direct entry into a remote computer. The electronic odometer provides a relatively inexpensive means for automatically recording times, dates and total mileage of a vehicle trip as well as average and maximum speeds of the trip and a speed profile of the trip. The electronic odometer operates automatically and does not require manual operation or actuation on the part of the vehicle operator. The odometer may be employed for monitoring traffic law compliance in addition to vehicle operational performance. The odometer may also be employed for remote identification of the vehicle to which the odometer is mounted. The information recorded by the odometer is in machine readable form which ordinarily may only be read by means of a compatible remote unit.

BRIEF SUMMARY OF THE INVENTION

Briefly stated, the invention in a preferred form is an electronic hub odometer comprising a housing which is adapted to be mounted for rotation with a vehicle wheel. A permanent magnet is mounted in fixed position to the housing and is rotatable therewith. A magnetic reed switch is actuated in response to the permanent magnet for each revolution of the vehicle wheel to produce a discrete revolution signal indicative of each wheel revolution. A clock crystal is employed to generate clocking pulses. A programmable integrated circuit includes registers which accumulate the numbers of pulses and revolution signals and processes the accumulated data to produce data indicative of the elapsed time, total distance and rate of travel of the vehicle wheel. The data is stored in a memory. An infrared light emmiting diode is employed to transmit data from the memory for remote read-out. The magnetic switch, the clock, the integrated circuit, the memory and the light emitting diode are preferably mounted on a core frame which is pivotally suspended within the housing.

a photo-optical detector is also employed to receive remote signals for programming the odometer and inputting data into the odometer. A remote programmer-/interrogator unit cooperates with the odometer to receive and transmit information from and to the odometer. The commencement and termination of a trip of the associated vehicle is automatically determined by the odometer.

DETAILED DESCRIPTION OF THE INVENTION

Figure 1:
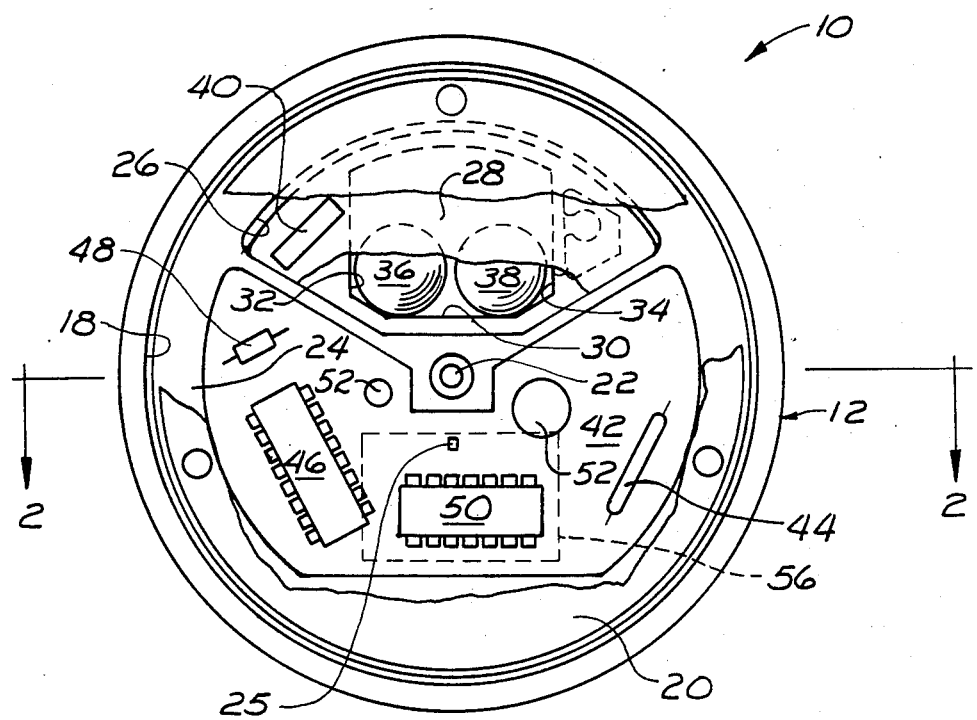
FIG. 1 is a front sectional view, partly broken away and partly in section, illustrating an electronic hub odometer of the present invention.
Figure 2:
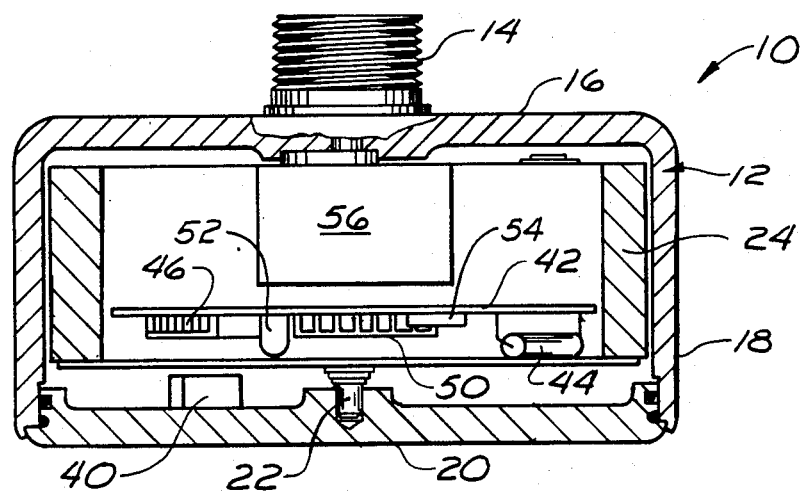
FIG. 2 is a transverse sectional view, partly broken away and partly in section, taken substantially along the line 2—2 of FIG. 1.
Figure 3:
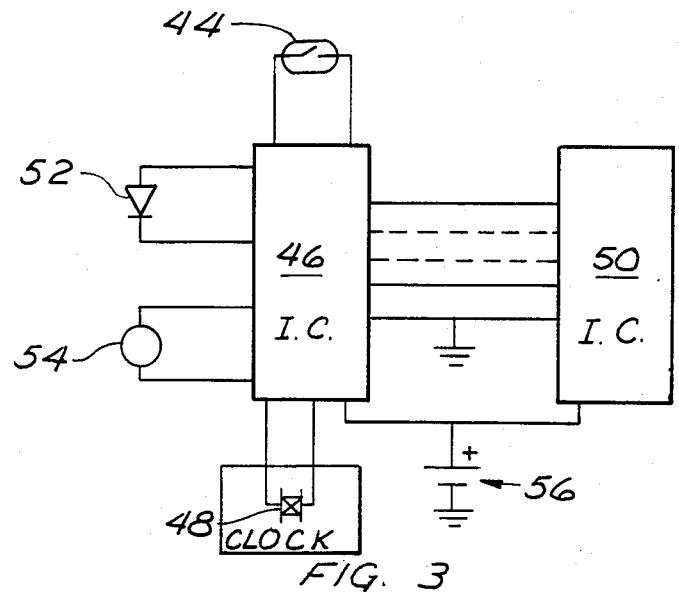
FIG. 3 is a diagram partially in schematic form and partially in block form, of a circuit employed in the electronic odometer of FIG. 1.

With reference to the drawing wherein like numerals represent like parts throughout the several FIGURES, an electronic hub odometer in accordance with the present invention is generally designated by the numeral 10. Electronic hub odometer 10 has a cylindrical casing 12 which is adapted to be mounted on a rotatable vehicle hub or wheel (not illustrated) for coaxial rotation with the vehicle wheel. A threaded boss 14 which is adapted to be screwed into a threaded aperture (not illustrated) of the vehicle wheel hub may be employed to mount the casing to the hub so that no external fasteners are required. The generally cub-shaped casing 12 has a rear wall 16 and an annular side wall 18. A window 20 formed of a transparent material is sealed with the annular side wall 18 to provide a housing which is substantially leak proof.

A support shaft 22 is non-rotatably fixed within the formed housing coaxial with the casing 12 and, upon mounting the casing to a wheel hub, is therefore coaxial with the wheel hub and wheel to which the hub odometer is mounted. A core frame 24 is pivotally suspended on the support shaft 22 and enclosed within the housing formed by the casing 12 and the front window 20. The frame 24 is employed for mounting various electronic circuitry and components as will be further described below. The frame 24 has an eccentrically located center of gravity (generally designated by point 25, which is radially off-set from the support shaft 22 so that the frame is supported for pivotal motion relative to the shaft 22 in a pendulous fashion. During normal operation of the hub odometer, the pendulous frame is restrained against rotation with the wheel to which the casing 12 is mounted due to the off-set center of gravity. Thus, the casing 12 rotates with the associated wheel while the enclosed pendulous frame 24 remains generally in a suspended pivotal orientation (as illustrated in FIG. 1) with some limited pendulous movment relative to the support shaft 22 upon rotation of the wheel due to acceleration and deceleration forces of the vehicle.

The pendulous frame 24 is preferably formed with a sector opening 26 which is generally positioned diameterally opposite (above) the center of gravity 25 of the frame. A damping mechanism such as disclosed in U.S. Pat. No. 4,156,131, which patent is assigned to the assignee of the present invention, includes a ball assembly designated generally by the numeral 28. A ball case 30 is formed with a pair of ribs 32 and 34 which function to provide a radial track diametrically of the center of gravity of the pendulous frame. A pair of damping balls 36 and 38 are received in case 30. The ball track limits the ball movement to substantially radial movement while also permitting the balls to bounce around to a degree within the case 30 for dissipating rotational energy of the pendulum mass. The function of the ball assembly is to prevent oscillation or rotation of the pendulous frame due to vertical acceleration of the vehicle wheel to which the hub odometer is mounted and in particular substantially vertical downward acceleration (such as may result from the vehicle wheel encountering a rut or pothole). The ball assembly also functions to reduce the angular impulse on the pendulous frame during horizontal acceleration and deceleration of the vehicle wheel to which the hub odometer is mounted.

A permanent magnet 40 is mounted in fixed position at the interior of the window 20 at a position which is radially offset from the central axis of rotation of the odometer housing. Thus, upon mounting the odometer to a wheel, permanent magnet 40 rotates with the wheel.

Pendulous frame 24 mounts a circuit board 42 which is secured in fixed relationship with the frame. A magnetic reed switch 44 is mounted to the circuit board and is generally radially alignable with the permanent magnet 40 whereby angular rotation of the housing relative to frame 24 results in the permanent magnet 40 and the magnetic reed switch 44 serially aligning for magnetic interaction for each revolution of the odometer housing and therefore of the wheel. The reed switch 44 is positioned and configured so that the angular alignment of the magnet with the switch produces a momentary discrete switch closure and hence a detectable signal for each revolution of the housing. A switch which opens a circuit in accordance with each wheel revolution may also be employed. Other non-magnetic actuated wheel revolution detectors may also be employed.

A custom integrated circuit 46 which is preferably of CMOS form requiring a relatively low current is affixed to circuit board 42. Integrated circuit 46 functions as an electronic communicates with circuit 46 for transmitting signals indicative of the detected wheel revolutions. Circuit 46 includes a contact input conditioning circuit and a scaling register for accumulating and temporarily storing the number of switch closures of reed switch 44. A clock crystal 48 is mounted to circuit board 42 in electrical communication with circuit 46. Clock crystal 48 generates timing pulses which are employed to determine the time, date and time intervals employed in connection with the processing and compiling of the odometer data. Integrated circuit 46 includes an oscillator circuit which communicates with clock crystal 48 to oscillate at approximately 32 khz. Integrated circuit 46 includes an additional input circuit for accumulating the number of oscillations in the oscillation circuit and a second scaling register for temporarily storing the number of oscillations.

The central processor portion of integrated circuit 46 includes a read-only memory for storing a program. The contact closure data and the clock oscillation data are processed according to the program. Various input data and instructional information may be input into circuit 46. A static or dynamic CMOS random access memory integrated circuit 50 such as Intersil type IM6504IDN is mounted to circuit board 42 and communicates with integrated circuit 46 for storing the data generated and processed by the integrated circuit 46. Integrated circuit 46 communicates with a remote unit for transmitting and receiving information as will be described below.

The integrated circuit 46 also functions to retrieve the data which is stored in the ramdom access memory integrated circuit 50. An infrared light emitting diode 52 such as a General Electric F5G1 diode is mounted to circuit board 42 for optically transmitting the data to a remote unit. The integrated circuit 46 includes a driver circuit for operating the light emitting diode 52. A photo optical sensor 54 such as a General Electric type L14R sensor electrically communicates with the integrated circuit 46 for receiving information from a remote unit by means of infrared pulses and for transmitting the received information to the integrated circuit 46. Integrated circuit 46 includes an amplifier circuit for enhancing the power of the pulses received by the sensor 54 so that the information may be processed by the circuit 46. The transmission frequency is typically a few kilohertz. A lithium battery 56 is mounted to the circuit board 42 for supply power to the foregoing described electronic circuitry.

In accordance with a preferred form of the electronic hub odometer, the hub odometer functions to record the time, date and mileage for each of a number of discrete trips, the average and maximum speeds for the trips, the time and duration of the trips in excess of a given threshhold speed, and speed profile for the trips. Ordinarily the information is not readable without a compatible remote programmer/interrogator or similar device, i.e., the data accumulated and processed by the odometer is in machine readable form only. The information is automatically generated by the electronic hub odometer without requiring or permitting any actuation or operational control of the odometer by the vehicle operator.

The processing of the data by the electronic odometer is controlled by a program which is stored in the read-only memory (ROM) of the integrated circuit 46. In accordance with a preferred embodiment of the invention, each revolution of the wheel to which the odometer is mounted results in a single closure event of the reed switch 44. The odometer advantageously operates automatically without manual operational control by programming into the circuit a definition of what constitutes the commencement and termination of a trip. In the event that no revolution indicating switch closures have occurred during a time interval greater than a pre-established trip and threshhold interval, the integrated circuit is placed in a stand-by mode. Whenever a contact closure occurs while the circuit is in the stand-by mode, the circuit commences counting timing pulses and switch contact closures. The number of contact closures is multiplied by the wheel circumference which is stored in the memory or program to determine the distance traveled by the vehicle. Alternately, the actual computing of the distance traveled may be undertaken by a remote computer unit as described below.

A trip start threshhold time interval is also stored in the program. In the event that the vehicle travels a distance equal to or greater than the distance stored for the trip start threshhold in a time equal to the number of minutes stored for the trip start threshhold, the time and date of the occurrence of the initial contact closure is stored in memory. A typical trip start threshhold is on the order of 0.5 miles in five minutes. The purpose of the trip start threshhold is to define the commencement of a trip so that a trip may be distinguished from short start and stop intervals which are a portion of a larger trip and from short start and stop intervals which are for maintenance or trip preparation and/or loading puposes or due to traffic congestion, traffic lights, and/or traffic stoppage. Both the definition of a trip start and a trip end may vary from vehicle to vehicle in accordance with the normal operational characteristics of the vehicle and the tasks associated to the vehicle. Accordingly, the specific trip start threshhold and trip end threshhold values are preferably pre-established values which may be selectively inputted into the circuit 46.

The processor of the integrated circuit 46 upon conditioning the circuit for a trip mode commences totalizing the wheel revolution contact closures of reed switch 44 for six-second time intervals. Naturally, other time intervals may be employed. The totals for each interval are sequentially stored in memory up to a total of 150 intervals. After the 150 interval total is attained, the succeeding interval totals are stored in the memory locations employed for the earliest stored interval totals on a first in-first written over storage basis.

After a total of ten six-second interval totals are stored in the memory, the total distance for the ten intervals (one minute) is determined and stored in a memory location designated for a maximum trip speed. Likewise, the total distance for each succeeding group of ten intervals, i.e., each succeeding one minute interval, is determined and compared to the maximum trip speed distance. If a succeeding totalled distance is greater than that stored in the maximum trip speed location, the new distance replaces the existing distance and becomes the new maximum trip speed distance.

The total distance for each group of ten six-second intervals is also compared to an excessive speed threshhold which is stored in the memory. If the total distance of a group of ten intervals exceeds the excessive speed threshhold, a corresponding count is generated and stored in a memory location designated for the time of the trip which occurs at excessive speed conditions. The count is successively incrementally increased by one for each group of ten intervals as total distance exceeds the excessive speed threshhold. In this manner a means is provided for automatically monitoring the time wherein the vehicle is operated at excessive speeds. Naturally, a speed range other than a defined excessive speed range could be selected for monitoring in a manner analogous to that described for an excessive speed range.

As the processor of the integrated circuit 46 receives the wheel revolution contact pulses from the magnetic switch 44, the processor also determines the total distance traveled by the vehicle. For example, for every 0.1 miles traveled a count is added to a memory location which is designated for the trip distance and to a memory location designated as the vehicle odometer reading. In the event that no wheel revolution contact closures are received for a time interval equal to the pre-established trip end threshhold interval, the time and date of occurrence of the last contact closure is stored in memory for identification of the termination of the trip. Typically, the trip end threshhold time interval is on the order of ten minutes.

Additional processing by the processor of the integrated circuit is suspended subsequent to the trip end threshhold event until either another wheel revolution contact closure occurs or until the electronic hub odometer is interrogated by a remote programmer/interrogator unit as will be described below. The next contact closure results in the foregoing processing sequence essentially repeating. The data from each succeeding trip is stored in serially designated memory locations until such time as no more locations are available. When each of the memory locations has been used, the data from the next trip is stored in place of the earliest recorded trip data on a first in-first written over basis. The odometer memory is configured to prevent erasure of the stored information other than erasure resulting from exhaustion of available storage.

The data is stored in the RAM integrated circuit 50 and is retrieved by circuit 46 for remote read-out via an infrared light emitting diode 52. In preferred form, the data is optically transmitted to a remote programmer/interrogator unit as will be described below. The data may require as few as 72 bits of memory for each trip. The data may consist of information for each of a number of trips such as:

a. the time and date of the start of the recorded trip in minutes, hours and date (16 bits)
b. the distance of the recorded trip in 0.1 miles (16 bits)
c. the time and date of the end of the recorded trip in minutes, hours and date (16 bits)
d. the maximum speed attained during the recorded trip (8 bits)
e. The number of minutes during which the vehicle was operated at a speed in excess of an established threshhold speed (16 bits)

In addition the data may include:
f. the vehicle identification number
g. the current vehicle odometer reading
h. a speed profile comprising the vehicle speed at each of a number of pre-established time subintervals for the last preceding pre-established profile time interval.

The purpose of the speed profile is to obtain a recorded operational data for analysis in the event of an accident.

Figure 4:
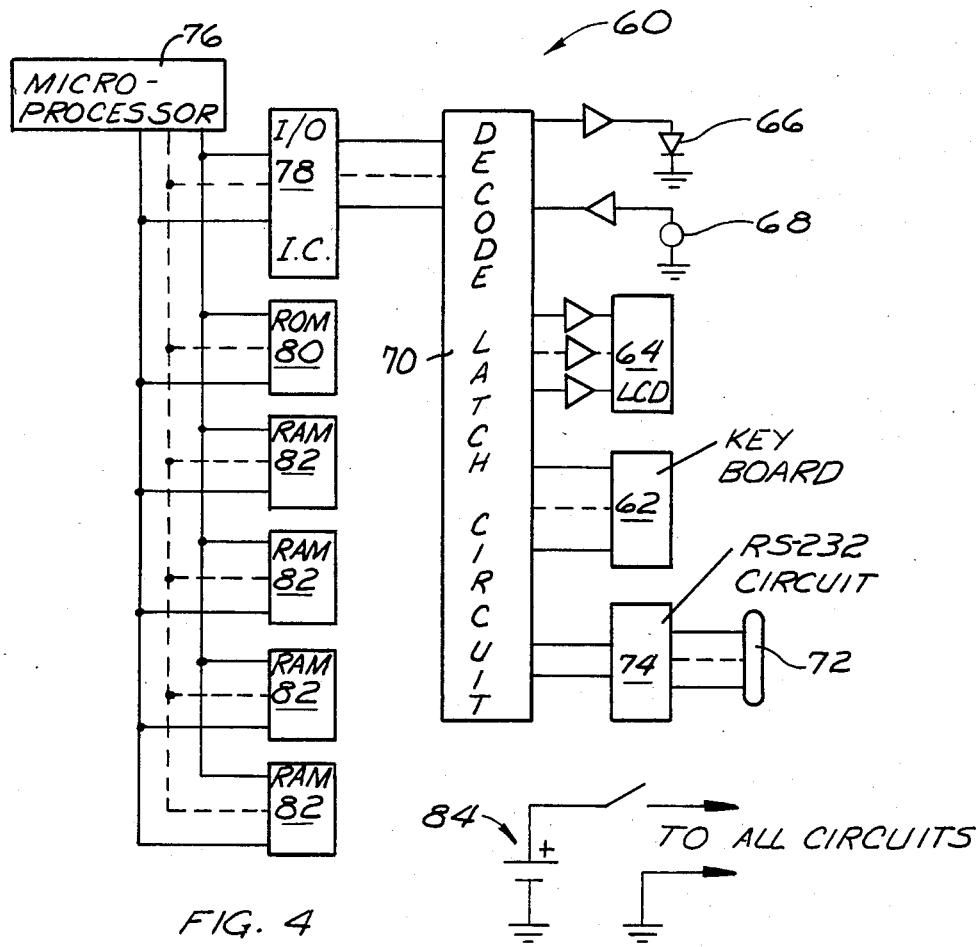
FIG. 4 is a diagram, partially in schematic form and partially in block form, of a circuit for a remote unit employed for communicating with the electronic odometer of FIG. 1.

With further reference to FIG. 4, a remote programmer/interrogator (PI) unit is generally designated by the numeral 60. The PI unit 60 is compatible for infrared data communication with the foregoing described hub odometer 10. The PI unit 60 is a battery-powered hand held device which preferably includes a key board 62 and a digital display 64. PI unit 60 also includes an infrared light emitting diode (LED) 66 for transmitting information for reception by the sensor 54 of the electronic odometer and a photo optical sensor 68 for receiving information transmitted from the infrared LED 52 of the electronic odometer. The PI unit 60 also contains a microprocessor and a random access memory which functions to store the data received from the electronic odometer 10. The PI memory preferably has a capacity for storing data from approximately 16 to 64 such odometers.

The infrared LED 66 and the photo sensor 68 electrically connect to a decoding and latch circuit 70 which also connects the keyboard 62 and the liquid crystal digital display 64. An RS-232 cable connector 72 connects via an RS-232 interface circuit 74 to circuit 70 to provide for a cable connection with a computer terminal (not illustrated). A microprocessor 76 such as the Intel type 8085 circuit controls the operation of the PI unit. The microprocessor 76 electrically communicates with circuit 70 via an I/O expander integrated circuit 78 such as the Intel type 8155 circuit. The program for operating the PI unit is stored in a read only memory (ROM) 80. ROM 80 may be the Intel type 8355 circuit. The data is stored in random access memories (RAMS) 82 such as the Intel type 2164-25 circuits. A nickel cadmium rechargeable battery 84 powers the circuits.

Information which is to be entered into the electronic odometer or for a number of such odometers may be entered via the PI through connector 72 and interface circuit 74 from a computer or manually via a terminal or such information may be entered by means of the keyboard 62 on the PI unit. The information in the PI unit may then be transferred to the odometer by pressing an appropriate button on keyboard 62 so that coded infrared pulses are transmitted from the light emitting diode 66 to the sensor 54 of the odometer.

The communication capabilities of the odometer 10 and the PI unit 60 may be advantageously exploited in a number of ways. For example, if the odometer 10 has previously been programmed, a vehicle identification number may be transmitted back to the PI unit which searches its memory for the information to be transmitted to the odometer for the given vehicle identification number. The information is then transmitted to the odometer via sensor 54 which retransmits the information via LED 52 to the PI unit for confirmation. Optical alignment between LED 52 and sensor 68 and between LED 66 and sensor 54 is ordinarily required in order to provide communication between the electronic odometer 10 and the PI unit 60. The alignment is ordinarily easily accomplished by manually aiming the receiver transmitter elements of the PI unit in the direction of the odometer. Because the PI unit 60 is portable, the PI unit may actually be positioned for direct contact with the odometer 10. Alternately, the function of the portable PI unit may be incorporated into a stationary unit mounted in a fixed position on a curb or by the side of a driveway. The infrared transmitter and receiver of the stationary unit are located at wheel hub level. When a vehicle having a hub odometer stops so that the odometer is within the communication range of the stationary PI unit, data may be transferred between the hub odometer and the stationary PI unit. The stationary PI unit may be wired to a remotely located computer for data capture, vehicle entry or exit control or for computing customer charges at vehicle rental agencies.

In the event that an electronic odometer has not been previously programmed and does not contain the vehicle identification number, then a vehicle identification number may be manually entered by means of the keyboard on the PI unit. The PI unit may also be employed to interrogate the electronic odometer. For example, upon actuation of an appropriate "READ" button on the keyboard, a coded signal may be sent to the electronic odometer which then transmits back the entire contents of the odometer RAM memory including the vehicle identification number. The received information may then be stored in a RAM 82 of the PI unit. After a number of electronic odometers have been interrogated by a given PI unit, the stored data can be transferred from the PI via interface circuit 74 and connector 72 to a computer or to a modem for remote transmission. Alternately, the data can be read word by word on the digital display 64 by appropriate actuation of a "DISPLAY" button on the key board.

Exemplary data transmitted from the PI unit to the electronic odometer may consist of the following information:

a. 8 digit vehicle identification number (32 bits)
b. time and date in minutes, hours, month, day and year (24 bits)
c. wheel circumference in 0.00001 mile increments (16 bits)
d. excessive speed threshhold value in 0.02 mile per minute increments (8 bits)
e. trip start threshhold value in increments of 0.1 miles and minutes (16 bits)
f. trip end threshhold in one minute increments (8 bits)
g. current vehicle odometer reading in 0.1 mile increments (32 bits)

The integrated circuit 50 preferably has a memory capacity of 16,384 bits (16k) although a storage capacity of 4,096 bits (4k) is sufficient. For a basic configuration, information generated by the integrated circuit 46 may be formatted for storage in a 4k capacity RAM integrated circuit 50 so that the vehicle identification number is allocated 32 bits, the odometer reading is allocated 32 bits, the time and date is allocated 32 bits and the wheel diameter is allocated 16 bits. The remaining capacity of the RAM could contain the latest 83 trip records which records would be retained on a first in-first written over basis within the memory. Each such trip record could be allocated 48 bits to consist of a date and time of start, a total distance of the trip and the date and time of finish of the trip. The dates and times would contain 5 bits for the day of the month, 5 bits for the hour of the day, and 6 bits for the minute. The distance would be allocated 16 bits representing up to 1,000 miles in increments of approximately 80 feet. Preferably, the distance would be stored in terms of wheel revolution units. The actual distance in miles could then be calculated by the remote PI unit 60. Data other than the described above may be transmitted between the electronic hub odometer and the PI unit. For example, as part of the response to an interrogation, a transmitted message may indicate that the battery requires replacement. A security code may be included as part of all messages transmitted to the odometer to preclude unauthorized interrogations of data changes.

In should be appreciated that the foregoing electronic odometer may also be configured so that the magnet is mounted for generally fixed positioning relative to a rotating wheel and some or all of the electronic circuitry and components essentially rotate with the wheel. It should also be appreciated that various additional forms of data may be procured from the foregoing described odometer which have not been set forth in the application herein.

While a preferred embodiment of the electronic hub odometer of the present invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. An electronic hub odometer comprising:
   a housing adapted to be mounted for rotation with a vehicle wheel;
   a magnet mounted in fixed position relative to said housing and rotatable therewith;
   magnetic sensor means responsive to said magnet to detect a revolution of said wheel and produce a revolution signal indicative thereof;
   clock means to generate clocking signals;
   data means responsive to said revolution and clocking signals to produce data indicative of distance of travel of said wheel for a series of pre-established time intervals;
   memory means to store said data;
   transmitter means selectively actuable to transmit said data in electromagnetic waveform from said memory means for remote readout; and
   mounting means pivotally suspended within said housing to mount said magnetic sensor means, said clock means, said data means, said memory means and said transmitter means.

2. The electronic hub odometer of claim 1 wherein the magnetic sensor means comprises a magnetic reed switch.

3. The electronic hub odometer of claim 1 wherein the transmitter means comprises an infrared light emitting diode.

4. The electronic hub odometer of claim 1 further comprising a photo-optical detector means to receive remote signals and relay said signals to the data means.

5. The electronic hub odometer of claim 1 wherein the memory means comprises a random access memory integrated circuit.

6. The electric hub odometer of claim 1 wherein the data means comprises a programmable controller and central processor circuit and includes a read only memory.

7. The electronic hub odometer of claim 6 wherein the data means further includes totalizer means for accumulating and temporarily storing the number of revolution signals and clocking signals.

8. The electronic hub odometer of claim 1 further comprising a programmer interrogator means remote from said housing to receive and store data transmitted from said transmitter means.

9. The electronic hub odometer of claim 1 wherein the data further includes data indicative of the rate of travel of said wheel and time duration of the rate of travel of said wheel for a pre-established rate range.

10. The electronic hub odometer of claim 1 wherein the clocking means comprises a clock crystal which generates timing pulses.

11. The electronic hub odometer of claim 1 wherein the data means further produces data indicative of the maximum rate of travel of said wheel.

12. The electronic hub odometer of claim 1 wherein said data means further cmprises trip defining means for automatically determining the commencement and termination of a vehicle wheel trip.

13. The electronic hub odometer of claim 1 wherein said transmitter means comprises an infrared transmitter.

14. An electric hub odometer adapted for operation in response to the rotation of an associated wheel of a vehicle comprising:
   wheel sensor means to detect a revolution of the vehicle wheel and produce a revolution signal indicative thereof;
   clock means to generate clocking signals;
   trip commencement means responsive to said revolution signal and said clocking signals to automatically determine the commencement of a trip of the vehicle;
   trip termination means to automatically determine the termination of a trip of the vehicle;
   data means responsive to said wheel sensor means, said clock means, and said trip commencement means to produce data indicative of the time and distance of a said vehicle trip and to produce data indicative of the rate of travel of said vehicle wheel for a sequence of pre-established time intervals immediately preceding the termination of a said trip;
   memory means to store at least a portion of said data; and
   transmitter means selectively actuable to transmit said stored data from said memory means for remote readout of said stored data.

15. The electronic hub odometer of claim 14 wherein the data means further produces data indicative of the time duration rate of travel of said vehicle wheel is in a pre-established rate range.

16. A method for monitoring the operation of a wheeled vehicle for determining vehicle usage comprising:
   (a) generating clocking signals;
   (b) counting the revolutions of a vehicle wheel;
   (c) employing the clocking signals and revolution counts to generate vehicle operation data;
   (d) automatically determining the commencement of a trip of said vehicle by employing selected portions of the operation data;
   (e) automatically determining the termination of a trip of said vehicle by employing selected portions of the operation data;
   (f) recording operation data in machine readable form in the vicinity of the vehicle wheel for the time interval between the determined commencement and termination of a vehicle trip;
   (g) automatically recording data indicative of the rate of travel of said vehicle for a series of time intervals immediately preceding the termination of a said trip; and
   (h) selectively transmitting said recorded data from the vicinity of said wheel to a remote recorder for remote readout.

17. The method of claim 16 wherein step (h) further comprises transmitting said recorded data by electromagnetic means.

18. The method of claim 16 wherein step (d) further comprises counting the number of the vehicle wheel revolutions for a pre-established time interval and comparing the number to a pre-established number.

19. The method of claim 16 further comprising the step of:
   (i) constructing a speed profile of the vehicle for the determined trip.

20. The method of claim 16 further comprising:
   (j) positioning the vehicle within the communication zone of the remote recorder; and
   (k) transmitting a triggering signal from said recorder to initiate transmission of the recorded data from the vicinity of the vehicle wheel to said recorder.

* * * * *

UNITED STATES PATENT AND TRADEMARK OFFICE
CERTIFICATE OF CORRECTION

PATENT NO. : 4,697,278

DATED : September 29, 1987

INVENTOR(S) : Donald W. Fleischer

It is certified that error appears in the above-identified patent and that said Letters Patent is hereby corrected as shown below:

Claim 14, line 1, substitute -- electronic -- for "electric".

Signed and Sealed this

Fifteenth Day of November, 1988

Attest:

DONALD J. QUIGG

Attesting Officer      Commissioner of Patents and Trademarks